United States Patent
Goodwin, III

(10) Patent No.: US 6,169,493 B1
(45) Date of Patent: *Jan. 2, 2001

(54) SHELF TALKER MANAGEMENT SYSTEM AND METHOD

(75) Inventor: John C. Goodwin, III, Suwanee, GA (US)

(73) Assignee: NCR Corporation, Dayton, OH (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/099,552

(22) Filed: Jun. 18, 1998

(51) Int. Cl.[7] .................................................. G06F 7/04
(52) U.S. Cl. ........................ 340/825.35; 705/20; 705/23
(58) Field of Search ................................ 705/14, 20, 23; 340/825.35, 825.49

(56) References Cited

U.S. PATENT DOCUMENTS

| | | | |
|---|---|---|---|
| 4,002,886 | 1/1977 | Sundelin | 235/61.7 R |
| 4,500,880 | 2/1985 | Gomersall et al. | 340/825.35 |
| 4,924,363 | 5/1990 | Kornelson | 362/125 |
| 5,172,314 | 12/1992 | Poland et al. | 364/401 |
| 5,198,644 * | 3/1993 | Pfeiffer et al. | 235/383 |
| 5,448,226 | 9/1995 | Faling, Jr. et al. | 340/825.35 |
| 5,771,005 | 6/1998 | Goodwin, III | 340/825.35 |
| 5,870,714 * | 2/1999 | Shetty et al. | 705/20 |

FOREIGN PATENT DOCUMENTS

| | | |
|---|---|---|
| 96/12243 | 4/1996 | (WO) . |
| 97/39398 | 10/1997 | (WO) . |

* cited by examiner

Primary Examiner—Michael Horabik
Assistant Examiner—Matsuichiro Shimizu
(74) Attorney, Agent, or Firm—Paul W. Martin

(57) ABSTRACT

A system and method of installing and removing shelf talkers which works in connection with electronic price labels. The system includes a bar code reader for reading first bar code labels of first items following installation of first shelf talkers, second bar code labels of a number of second items having second shelf talkers already installed, third bar code labels of third items following removal of third shelf talkers, and fourth bar code labels of a number of fourth items having fourth shelf talkers already removed, and for transmitting bar code information for the first, second, third, and fourth bar code labels and errors for the second and fourth items. The system further includes a computer for generating a list of the items including the first and second shelf talkers to be installed and the third and fourth shelf talkers to be removed, and for generating a report identifying placement of the first and second shelf talkers for the first and second items and the errors.

13 Claims, 3 Drawing Sheets

SHELF TALKER MANAGEMENT SYSTEM AND METHOD

BACKGROUND OF THE INVENTION

The present invention relates to shelf talker management systems, and more specifically to a shelf talker management system and method.

Shelf talkers are commonly used in retail establishments to distinguish specially promoted or "sale" items from other merchandise items and to attract customers to the specially promoted items. They typically include paper signs printed with promotional wording and special colors schemes. Shelf talkers are mounted to a shelf rail adjacent to specially promoted items. Some may be mounted perpendicular to the shelf rail to attract customers looking down an aisle from one end of the aisle.

Management of shelf talkers is largely a manual process. A store manager prepares a list of shelf talkers to be installed or removed and an operator uses the list to manually install or remove the shelf talkers.

In order to carry out an effective merchandising plan, a retailer must ensure that shelf talkers are correctly installed and removed. Accurate placement of shelf talkers allows a retailer to better predict customer reactions to shelf talkers.

There have been several precious attempts to simplify the manual in-store process. For example, U.S. Pat. No. 5,448,226 discloses a method of managing shelf talkers using an electronic price label (EPL) system.

The disclosed system relies exclusively on two way communication between an EPL and a computer. Special sensors or switches add cost to the EPLs. The system cannot determine whether the correct shelf talker has been installed. Also, the system is not suited for use in stores that also use printed price labels or other types of nonelectronic price labels.

It would be desirable to providing a shelf talker management system and method which can also accurately determine whether shelf talkers have been properly installed for items associated with printed price labels.

SUMMARY OF THE INVENTION

In accordance with the teachings of the present invention, a shelf talker management system and method are provided.

The system includes a bar code reader for reading first bar code labels of first items following installation of first shelf talkers, second bar code labels of a number of second items having second shelf talkers already installed, third bar code labels of third items following removal of third shelf talkers, and fourth bar code labels of a number of fourth items having fourth shelf talkers already removed, and for transmitting bar code information for the first, second, third, and fourth bar code labels and errors for the second and fourth items. The system further includes a computer for generating a list of the items including the first and second shelf talkers to be installed and the third and fourth shelf talkers to be removed, and for generating a report identifying placement of the first and second shelf talkers for the first and second items and the errors.

The method includes the steps of generating a list of the shelf talkers, scanning first bar code labels of first items following installation of the first shelf talkers by a bar code reader within the hand-held terminal, scanning second bar code labels of second items having shelf talkers already installed by the bar code reader within the hand-held terminal and logging errors for the second items, transmitting bar code information for the first and second bar code labels and the errors to a computer by the hand-held terminal, and generating a report identifying placement of the first and second shelf talkers and the errors by the computer.

It is accordingly an object of the present invention to provide a shelf talker management system and method.

It is another object of the present invention to provide a shelf talker management system and method which track installation of shelf talkers in store environments containing printed labels.

It is another object of the present invention to provide a shelf talker management system and method which track installation of shelf talkers in store environments containing both electronic price labels and printed labels.

It is another object of the present invention to provide a shelf talker management system and method which uses electronic price labels where available to identify items requiring shelf talkers and requiring removal of shelf talkers.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
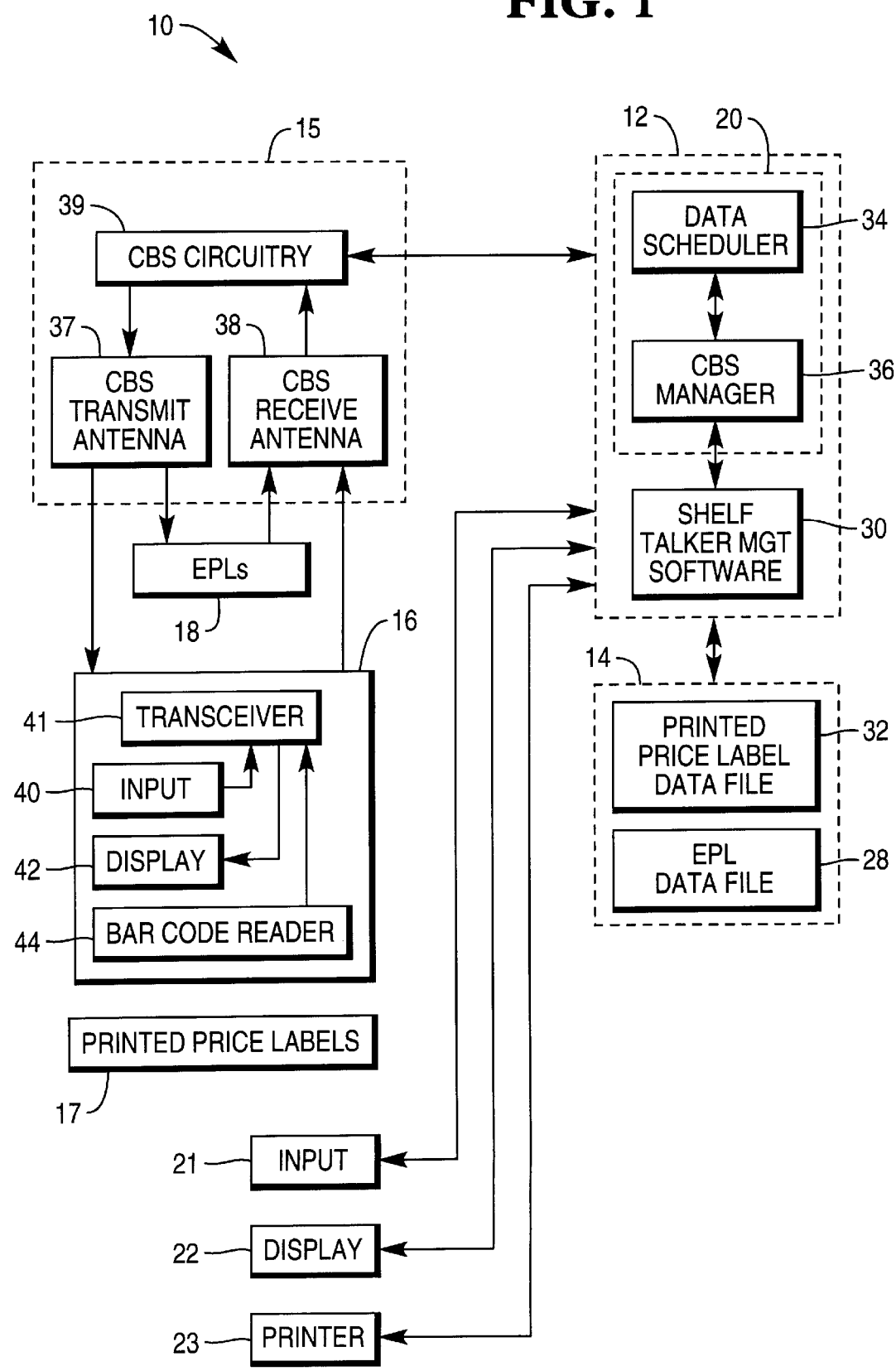
FIG. 1 is a block diagram of a first embodiment of a shelf talker management system.

Referring now to FIG. 1, system 10 includes computer 12, storage medium 14, communication base stations (CBSs) 15, hand-held terminal 16, printed price labels 17, input device 21, display 22, and printer 23. System 10 also forms the basis for an electronic price labels (EPL) system including EPLs 18. However, the present invention envisions that other suitable known communication equipment may be employed in store environments that do not already have EPL systems in order to manage installation of shelf talkers for items associated with printed price labels.

As used herein, printed price labels 17 include any non-electronic price label, such as paper or plastic price labels containing price information that is printed or applied in some other manner.

Computer 12 executes control software 20 and shelf talker management software 30. Control software 20 records, schedules, and transmits all messages to hand-held terminal 16 and EPLs 18 through CBSs 15, and receives and analyzes status messages from hand-held terminal 16 and EPLs 18 through CBSs 15. Such messages include queries to hand-held terminal 16 requesting an acknowledgment signal. Hand-held terminal 16 and EPLs 18 do not initiate communication with computer 12, they only respond to requests from computer 12.

Control software 20 primarily includes data scheduler 34 and CBS manager 36. Data scheduler 34 schedules shelf talker management messages to be sent to hand-held terminal 16 through CBSs 15. If system 10 also functions as a price display system, data scheduler 34 also schedules EPL price change messages to be sent to EPLs 18.

CBS manager 36 schedules the actual transmission of messages to hand-held terminal 16 and EPLs 18 and the reception of messages from hand-held terminal 16 and EPLs 18.

Figure 2:
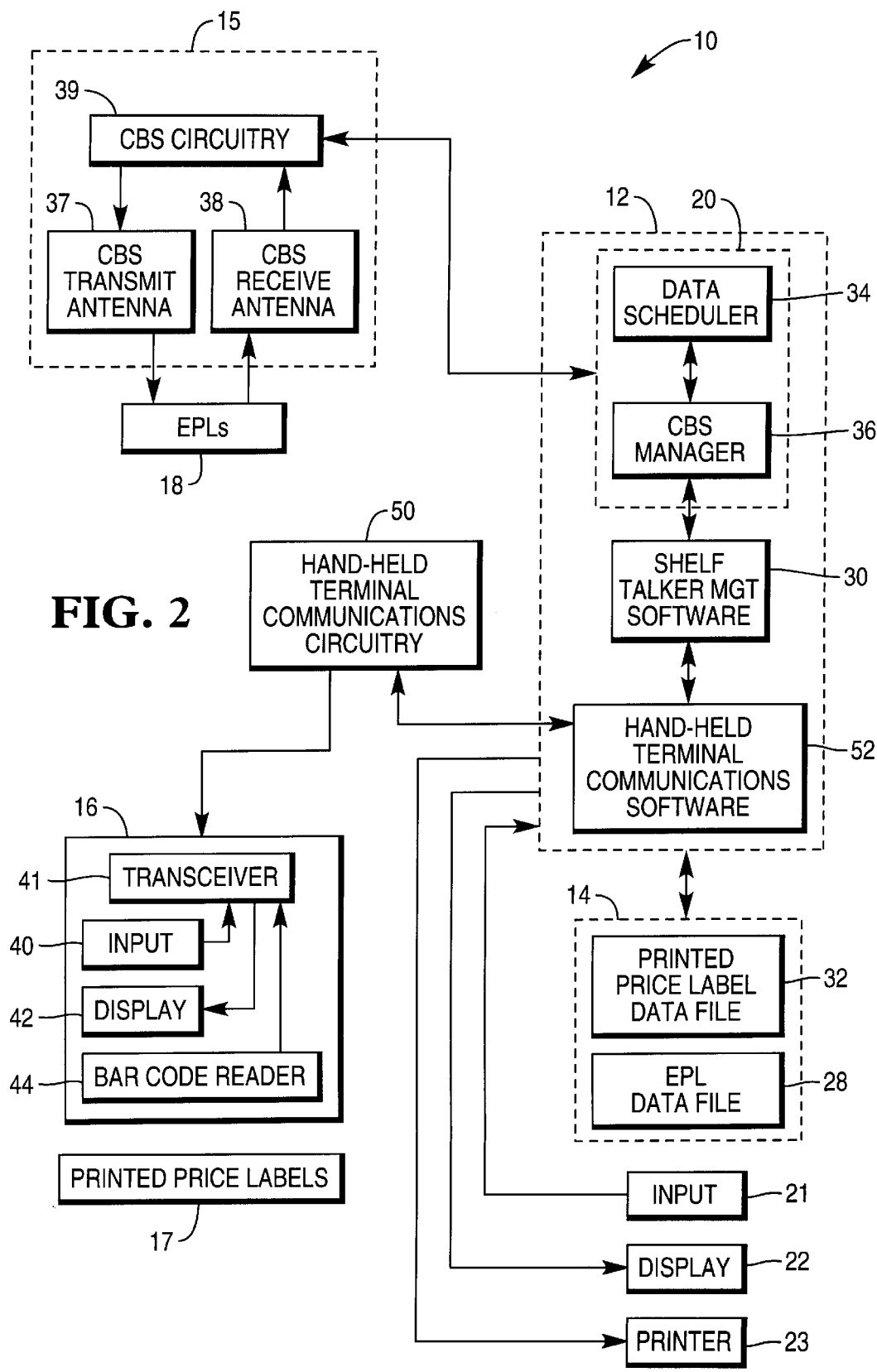
FIG. 2 is a block diagram of a second embodiment of a shelf talker management system.

Alternatively, hand-held terminal 16 may communicate at different frequencies through its own communication hardware and controlling software (FIG. 2).

Shelf talker management software 30 processes shelf talker position and type information entered by an operator through input device 21. Following entry of the information, shelf talker management software 30 produces a task list for an operator containing changes in shelf talker positions. Shelf talker management software 30 also generates reports containing shelf talker information at a first moment in time and shelf talker information at a second moment in time after an operator has walked through the store installing or removing shelf talkers in accordance with the task list. Shelf talker management software 30 displays or prints the before and after reports on display 22 and printer 23 for management comparison and review. Shelf talker management software 30 performs these functions in systems containing a mix of EPLs and printed price labels and in systems containing only printed price labels. In addition, shelf talker management software 30 causes EPLs requiring installation or removal of shelf talkers to display corresponding messages to minimize operator errors.

Shelf talker management software 30 stores the locations and types of shelf talkers for items associated with printed price labels in price label data file 32 and for items associated with EPLs 18 in EPL data file 28.

Storage medium 14 is preferably a fixed disk drive. Storage medium 14 stores EPL data file 28, and paper label data file 32.

CBSs 15 each include one transmit antenna 37 and up to four receive antennas 38 for transmitting and receiving messages between CBSs 15 and hand-held terminal 16 and EPLs 18. CBSs 15 each include CBS circuitry 39 which controls operation of each CBS 15.

Hand-held terminal 16 contains uniquely addressable transceiver circuitry 41. Transceiver circuitry 41 can be queried by computer 12 and can transmit responses to query messages. Hand-held terminal 16 sends item information to computer 12 during operator processing of items on the task list.

Hand-held terminal 16 also includes keypad 40, display 42, and bar code reader 44. Keypad 40 provides operator inputs for controlling operation of hand-held terminal 16. Display 42 displays information including task lists and reports. Bar code reader reads bar codes on items and shelf talkers associated with EPLs 18 and printed price labels 17 on the task list. Using hand-held terminal 16, an operator may also send a message to the EPLs associated with changed shelf talker information instructing those EPLs to stop displaying special messages.

Input device 21 allows an operator to enter new shelf talker information for changing shelf talker positions. It allows an operator to enter completed shelf talker information after shelf talker positions have been changed. Finally, in systems including EPLs 18, input device 21 allows an operator to send a message to the EPLs associated with changed shelf talker information instructing those EPLs to stop displaying special messages.

Referring now to FIG. 2, a second embodiment is similar to the first embodiment of FIG. 1, except that hand-held terminal 16 communicates through its own communication hardware 50 and controlling software 52. Shelf talker management software 30 coordinates communication with EPLs 18 through control software 20 and coordinates communication with hand-held terminal 16 through hand-held terminal communication software 52.

Figure 3:
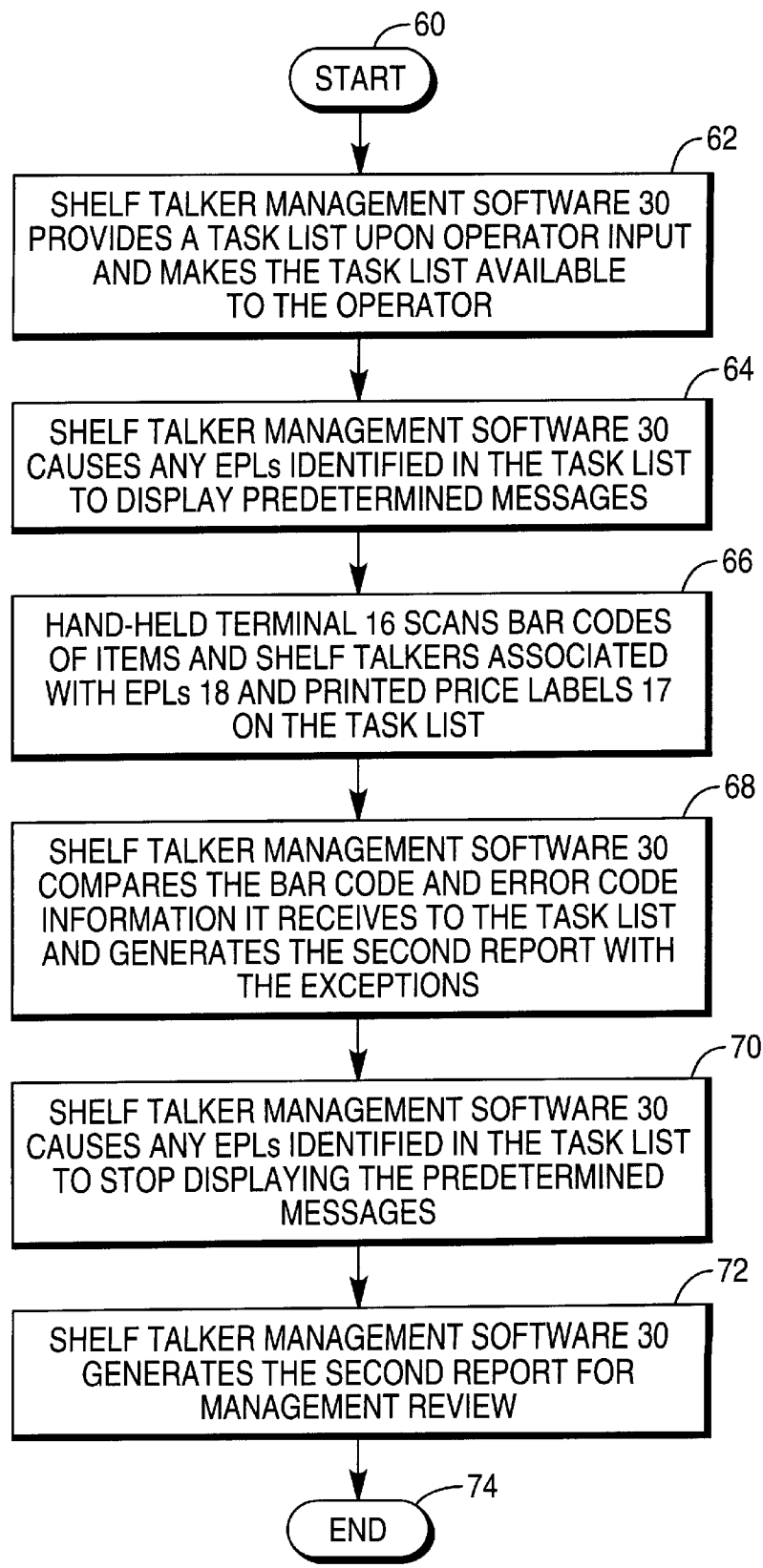
FIG. 3 is a flow diagram illustrating a shelf talker management method.

Turning now to FIG. 3, the operation of shelf talker management software 30 is explained in more detail, beginning with START 60.

In step 62, shelf talker management software 30 provides a task list upon operator input. The task list may be .sorted guide an operator along a most efficient path through the store. Shelf talker management software 30 makes the task list available to the operator by broadcasting it hand-held terminal 16. Hand-held terminal 16 displays the task list. Shelf talker management software 30 may additionally print a copy of the task list using printer 23.

In step 64, shelf talker management software 30 causes any EPLs identified in the task list to display predetermined messages to assist the operator in response to operator input. The operator may also remotely initiate the display of the predetermined messages using hand-held terminal 16.

In step 66, hand-held terminal 16 scans bar codes of items associated with EPLs 18 and printed price labels 17 on the task list. If the items already have shelf talkers, hand-held terminal 16 scans bar codes on the items or on the shelf talkers. Following scanning of each item and each shelf talker, hand-held terminal 16 transmits the bar code information to computer 12. If the operator finds errors in the placement of shelf talkers, the operator logs an exception to the task list, and transmits the error code to computer 12.

In step 68, shelf talker management software 30 compares the bar code and error code information it receives to the task list and generates the second report with the exceptions.

In step 70, shelf talker management software 30 causes any EPLs identified in the task list to stop displaying the predetermined messages after the operator has transmitted data for the EPLs. The operator may also remotely stop the display of the predetermined messages using hand-held terminal 16 after each visit to an EPL on the task list.

In step 72, shelf talker management software 30 generates the second report for management review.

In step 74, the method ends.

Advantageously, the system and method of the present invention allow a retailer to ensure that shelf talkers are associated with the correct merchandise items. Retailers can use audit tracking information in the reports, including shelf talker installation and removal dates and times, to base future sales and decisions. In other words the retailer can determine whether the items were properly advertised and then make future decisions based upon the information. When implemented as part of an electronic price label system, the system and method of the present invention provide a cost-effective solution. EPLs 18 do not require special sensors or extensive two-way communications capabilities.

Although the present invention has been described with particular reference to certain preferred embodiments thereof, variations and modifications of the present invention can be effected within the spirit and scope of the following claims.

I claim:

1. A method of installing shelf talkers for items in a transaction establishment comprising the steps of:
   (a) generating a list of the shelf talkers;
   (b) scanning first bar code labels of first items following installation of the first shelf talkers by a bar code reader within a hand-held terminal;

(c) scanning second bar code labels of second items having shelf talkers already installed by the bar code reader within the hand-held terminal and logging errors for the second items;

(d) transmitting bar code information for the first and second bar code labels and the errors to a computer by the hand-held terminal; and (e) generating a report identifying placement of the first and second shelf talkers and the errors by the computer.

2. The method as recited in claim 1, further comprising the steps of:

(f) sending a first message to electronic price labels associated with a number of the items to display predetermined messages which distinguish the number of items from other items not on the list; and (g) sending a second message to the electronic price labels to stop displaying the predetermined messages following installation.

3. The method as recited in claim 2, wherein step (f) comprises the substep of:

(f-1) transmitting the first message by the hand-held terminal.

4. The method as recited in claim 2, wherein step (f) comprises the substep of:

(f-1) transmitting the first message by the computer.

5. The method as recited in claim 1, further comprising the step of:

(f) sorting the list in an order that results in a shortest path through the transaction establishment for a person placing the shelf talkers.

6. The method as recited in claim 1, further comprising the step of:

(f) transmitting the list of the shelf talkers to the hand-held terminal; and (g) displaying the list by the hand-held terminal.

7. The method as recited in claim 1, further comprising the step of:

(f) printing another report including the list prior to step (b).

8. A method of installing shelf talkers for items in a transaction establishment comprising the steps of:

(a) transmitting a list of the shelf talkers to a hand-held terminal;

(b) sorting the list in an order that results in a shortest path through the transaction establishment for a person placing the shelf talkers;

(c) displaying the sorted list by the hand-held terminal;

(d) sending a first message to electronic price labels associated with the items to display predetermined messages which distinguish the items from other items not on the list by the hand-held terminal;

(e) scanning first bar code labels of first items following installation of the first shelf talkers by a bar code reader within the hand-held terminal;

(f) scanning second bar code labels of second items having second shelf talkers already installed by the bar code reader within the hand-held terminal and logging errors for the second items;

(g) transmitting bar code information for the first and second bar code labels and the errors to a computer by the hand-held terminal;

(h) sending a second message to the electronic price labels to stop displaying the predetermined messages; and (i) generating a report identifying placement of the first and second shelf talkers and the errors by the computer.

9. A method of installing and removing shelf talkers for items in a transaction establishment comprising the steps of:

(a) transmitting a list of the items including a first group of shelf talkers to be installed and a second group of shelf talkers to be removed to a hand-held terminal;

(b) sending a first message to electronic price labels associated with the items to display predetermined messages which distinguish the items from other items not on the list;

(c) scanning first bar code labels of first items following installation of the first shelf talkers in the first group by a bar code reader within the hand-held terminal;

(d) scanning second bar code labels of a number of second items having second shelf talkers in the first group already installed by the bar code reader within the hand-held terminal and logging errors for the second items;

(e) scanning third bar code labels of third items following removal of third shelf talkers in the second group by the bar code reader within the hand-held terminal;

(f) scanning fourth bar code labels of a number of fourth items having fourth shelf talkers in the second group already removed by the bar code reader within the hand-held terminal and logging errors for the fourth items;

(g) transmitting bar code information for the first, second, third, and fourth bar code labels and the errors for the second and fourth items to a computer by the hand-held terminal;

(h) sending a second message to the electronic price labels to stop displaying the predetermined messages; and (i) generating a report identifying placement of the first and second shelf talkers for the first and second items and the errors by the computer.

10. A method of installing and removing shelf talkers for items in a transaction establishment comprising the steps of:

(a) transmitting a list of the items including a first group of shelf talkers to be installed and a second group of shelf talkers to be removed to a hand-held terminal;

(b) sending a first message to electronic price labels associated with a number of the items to display predetermined messages which distinguish the items from other items not on the list;

(c) scanning first bar code labels of first items following installation of the first shelf talkers in the first group by a bar code reader within the hand-held terminal;

(d) scanning second bar code labels of a number of second items having second shelf talkers in the first group already installed by the bar code reader within the hand-held terminal and logging errors for the second items;

(e) scanning third bar code labels of third items following removal of third shelf talkers in the second group by the bar code reader within the hand-held terminal;

(f) scanning fourth bar code labels of a number of fourth items having fourth shelf talkers in the second group already removed by the bar code reader within the hand-held terminal and logging errors for the fourth items;

(g) transmitting bar code information for the first, second, third, and fourth bar code labels and the errors for the second and fourth items to a computer by the hand-held terminal;

(h) sending a second message to the electronic price labels to stop displaying the predetermined messages; and (i) generating a report identifying placement of the first and second shelf talkers for the first and second items and the errors by the computer.

11. A method of installing and removing shelf talkers for items in a transaction establishment comprising the steps of:
   (a) generating a first report identifying a current placement of the shelf talkers by a computer;
   (b) generating a list of the items including a first group of shelf talkers to be installed and a second group of shelf talkers to be removed;
   (c) sending a first message to electronic price labels associated with a number of the items to display predetermined messages which distinguish the items from other items not on the list;
   (d) scanning first bar code labels of first items following installation of the first shelf talkers in the first group by a bar code reader within the hand-held terminal;
   (e) scanning second bar code labels of a number of second items having second shelf talkers in the first group already installed by the bar code reader within the hand-held terminal and logging errors for the second items;
   (f) scanning third bar code labels of third items following removal of third shelf talkers in the second group by the bar code reader within the hand-held terminal;
   (g) scanning fourth bar code labels of a number of fourth items having fourth shelf talkers in the second group already removed by the bar code reader within the hand-held terminal and logging errors for the fourth items;
   (h) transmitting bar code information for the first, second, third, and fourth bar code labels and the errors for the second and fourth items to the computer by the hand-held terminal;
   (i) sending a second message to the electronic price labels to stop displaying the predetermined messages;
   (j) generating a second report identifying a new placement of the shelf talkers by the computer; and
   (k) analyzing the first and second reports, the list, and the errors.

12. A system for installing and removing shelf talkers for items in a transaction establishment comprising:
   a hand-held terminal including a bar code reader for reading first bar code labels of first items following installation of first shelf talkers, second bar code labels of a number of second items having second shelf talkers already installed, third bar code labels of third items following removal of third shelf talkers, and fourth bar code labels of a number of fourth items having fourth shelf talkers already removed, and for transmitting bar code information for the first, second, third, and fourth bar code labels and errors for the second and fourth items; and
   a computer for generating a list of the items including the first and second shelf talkers to be installed and the third and fourth shelf talkers to be removed, and for generating a report identifying placement of the first and second shelf talkers for the first and second items and the errors.

13. A system for installing and removing shelf talkers for items in a transaction establishment comprising:
   a hand-held terminal including a bar code reader for reading first bar code labels of first items following installation of first shelf talkers, second bar code labels of a number of second items having second shelf talkers already installed, third bar code labels of third items following removal of third shelf talkers, and fourth bar code labels of a number of fourth items having fourth shelf talkers already removed, and for transmitting bar code information for the first, second, third, and fourth bar code labels and errors for the second and fourth items; and
   a computer for transmitting a list of the items including the first and second shelf talkers to be installed and the third and fourth shelf talkers to be removed to the hand-held terminal, for sending a first message to electronic price labels associated with a number of the items to display predetermined messages which distinguish the items from other items not on the list, for sending a second message to the electronic price labels to stop displaying the predetermined messages following installation and removal of the shelf talkers, and for generating a report identifying placement of the first and second shelf talkers for the first and second items and the errors.

\* \* \* \* \*